United States Patent Office 3,539,336
Patented Nov. 10, 1970

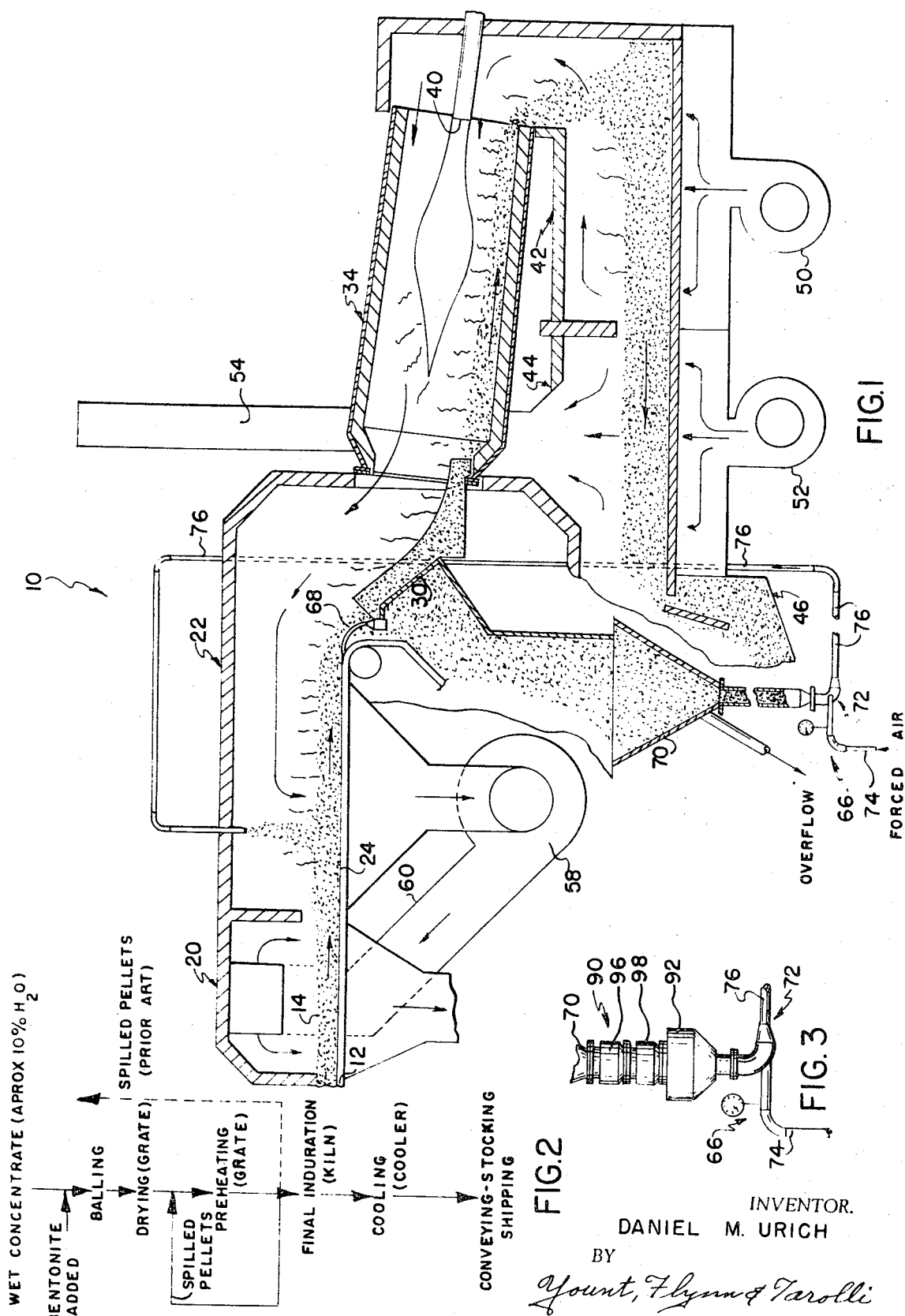

3,539,336
ORE PELLETIZING PROCESS AND APPARATUS
Daniel M. Urich, Hibbing, Minn., assignor to Eveleth Taconite Company, Forbes, Minn., a corporation of Minnesota
Filed Aug. 20, 1968, Ser. No. 754,042
Int. Cl. B65g 53/12; C21b 1/08; E27b 17/00
U.S. Cl. 75—3                                    8 Claims

ABSTRACT OF THE DISCLOSURE

An improved iron ore pelletizing apparatus and method includes a penumatic transport system for returning hot iron ore pellets, which are spilled while being transferred to an indurating kiln, to a preheating or drying furnace.

---

Taconite and other ores which require processing at very fine sizes are commonly agglomerated by a pelletizing process wherein green or wet pellets are formed and then fired or indurated to a desired hardness. Green or wet taconite pellets are formed by crushing crude ore, grinding the crude ore to a fine size (approximately 325 mesh), concentrating the ore magnetically, adding bentonite to the wet concentrate, dewatering the ore and rolling or balling the ore to form generally spherical green or wet pellets. The green or wet pellets are then transferred to a traveling-grate type indurating or hardening machine. The indurating or hardening machine usually includes drying and preheating furnaces where the green or wet pellets are heated and dried before being transferred to an indurating or final firing kiln where the pellets are fired or heated to the desired hardness.

It is customary in the traveling-grate type indurating machines now in operation to return pellets which are spilled while being transferred from the preheating furnace to the indurating or final-firing kiln back to the grinding or regrinding section. The pellets are then reground and subsequently completely reprocessed through the dewatering and balling steps. Approximately 1% to 3% of the pellets transferred through indurating or hardening machines, or approximately 5 to 20 tons per hour, are commonly reclaimed in the foregoing manner. At times the percentage of reclaimed pellets can rise to as high as 8% to 10% of the pellets transferred through the indurating machine, depending upon the proximity of the grate strippers to the grate.

It is an object of this invention to reduce the cost of pelletizing ores by providing a new and improved method and apparatus for reclaiming hot pellets which are spilled before being transferred to an indurating kiln.

Another object of this invention is to provide a new and improved apparatus for pelletizing ore including a pneumatic conveyor means for returning to a preheating or drying furnace hot ore pellets which are spilled as they are being transferred from the preheating furnace to an indurating kiln.

Another object of this invention is to provide a new and improved method of pelletizing ores wherein heated pellets which are spilled as they are being transferred to an indurating kiln are collected and conveyed back to a preheating or drying furnace.

These and other objects and features of the invention will become more apparent upon a consideration of the following description taken in connection with the accompanying drawings wherein:

FIG. 1 is a schematic illustration of a traveling grate type indurating or hardening machine constructed in accordance with the present invention;

FIG. 2 is a diagram illustrating the flow of material through the traveling grate type indurating or hardening machine of FIG. 1 and, in the dashed lines, the flow of material through a prior art traveling grate type indurating or hardening machine; and FIG. 3 is a schematic illustration of a second embodiment of the invention.

While it is contemplated that the apparatus and method forming the subject matter of the present invention will be used in pelletizing plants processing many different types of pellets, the present invention is particularly well adapted to iron ore pelletizing processes wherein finely divided iron ore particles are formed into pellets which are hardened so that they can be utilized as a part of the charge of a blast furnace. Due to its low quality, the iron ore called taconite and found in the Mesabi Range is particularly well suited for beneficiation by a pelletizing process. The pelletizing process includes two basic steps, the formation of green or wet pellets and the firing or indurating of the green pellets to the desired hardness.

Assuming taconite pellets are to be formed, the crude ore is first crushed to particles of approximately ¾ of an inch or less. This crushed ore is then ground in a rod mill-ball mill circuit to a fineness of about 325 mesh. The finely ground taconite ore is then magnetically concentrated and dehydrated or dewatered by passing through a thickener and a filter. The resulting filter cake or ore is broken up and mixed with an additive, such as bentonite, borax or lime, and rolled into small, generally spherical shapes, by a snow-balling technique during what is commonly called a balling step in which green or wet pellets of from ⅜ inch to 1½ inches in diameter are formed.

The green or wet pellets are heat treated or indurated to a desired hardness to facilitate shipping and handling of the pellets. In the present instance, the pellets are heat treated in a traveling-grate type pellet indurating or hardening machine, indicated at 10 in FIG. 1, having an input at 12 wherein the green or wet pellets 14 are received in a drying furnace 20. The green or wet pellets 14 are moved through the drying furnace 20 to a preheating furnace 22 by a traveling gate or conveyor 24. The green or wet pellets 14 are heated to a temperature of from 200° F. to 700° F. in the drying furnace 20 before passing on into the preheating furnace 22 where they are heated to a temperature of from 1200° F. to 2100° F.

The heated pellets are dumped from the conveyor 24 onto a transfer apparatus or chute 30 which conducts the pellets to a rotary indurating kiln or final firing section 34 of the traveling-grate type pellet indurating or hardening machine 10. Rotation of the kiln 34 causes the dry or preheated pellets to move downwardly through the kiln 34 as they are fired or heated to a temperature of approximately 2400° F. under the influence of a heat source 40. This firing or heating of the preheated pellets 14 hardens them to withstand shipping stresses. The hardened pellets 14 then descend to cooling sections 42 and 44 where they are cooled to a temperature of about 200° F. and are dumped onto a shipping or handling chute 46.

The pellets are cooled in the cooling section 42 and 44 by air which is blown through the pellets by fans 50 and 52. The air from the fan 52 is exhausted through a chimney or stack 54 while the air from the fan 50 passes upwardly through the pellets in the cooling section 42, as indicated by the arrows in FIG. 1, through the kiln 34 and preheating furnace 22 to a fan 58 which forces the air under pressure through a conduit or duct 60 to the drying furnace 20. The air is then exhausted from the drying furnace 20 by another fan (not shown).

In accordance with the present invention, pellets which spill from the chute 30 as they are being transferred from the preheating furnace 22 to the indurating kiln 34 are returned to the preheating furnace 22 by a pneumatic transport system 66. From 1% to 10% of the pellets flowing through the hardening machine 10, or from around 1 to 50 tons per hour depending on the rate of operation of the machine and proximity of the grate stripper 68 to the grate 24, may be spilled from the chute 30 and collected in a hopper 70. A pneumatic conveyor 72, including a source 74 of air under pressure and a duct or pipe 76, conveys the spilled pellets from the hopper 70 back to the preheating furnace 22 with relatively little heat loss to thereby tend to minimize the expense of operating the hardening machine 10. Also, the use of pneumaticc type conveyor 72 tends to minimize maintenance expense since it has no moving components to break down or deteriorate due to continued exposure to the relatively hot pellets. Maintenance expense is also decreased by providing the duct or pipe 76 with abrasion resistant elbows or turns. Thus, the spilled pellets are returned to the preheating furnace at a temperature which is usually above the 200° F. temperature to which the pellets are heated in the drying furnace 20 and is usually in excess of 1200° F. to thereby reclaim the heat energy previously added to the pellets. Although the pellets, in the illustrated embodiment of the invention, are conveyed by the pneumatic conveyor 72 to the preheating furnace 22, it is contemplated that in certain operations the spilled pellets may be conveyed back to the drying furnace 20.

With prior art constructions and methods of operation of traveling-grate type pellet indurating or hardening machines, similar to the machine 10, the spilled pellets are reclaimed by being completely reprocessed. This is shown by the flow diagram of FIG. 2 wherein the formation of the pellets in a balling machine and the indurating of the pellets in a travelling-grate type pellet indurating or hardening machine is indicated schematically. As is indicated by the dashed line in FIG. 2, the pellets which are spilled during the operation of prior art hardening machines are commonly reground in a grinding or regrinding operation, concentrated, dehydrated, reballed and then subsequently returned to the drying furnace as green or wet pellets. By the use of the pneumatic transport system 66, the present invention provides for the reclaiming of the spilled pellets by returning them directly to the preheating furnace while they are still hot and without the necessity of further processing, as is indicated by the solid line in FIG. 2. The pneumatic transport system 66 thereby eliminates regrinding, reballing and redrying of the spilled pellets.

A second embodiment of the invention is partially illustrated in FIG. 3. In this embodiment, a feed assembly 90 is provided between the hopper 70 and a secondary hopper 92 which is connected to the pneumatic conveyor 72. The feed assembly 90 and pellets in the hopper 70 function as an "air-lock" and allow intermittent feeding of hot pellets into the secondary hopper 92 which is pressurized and the pneumatic conveyor 72 with a minimum of pressure loss due to an escape of air. Although the feed assembly 90 can take many different forms, including those of a screw conveyor, rotary star gate or gate valve, a pair of pneumatically actuated double flapper valves 96 and 98 are illustrated for controlling the flow of pellets from the hopper 70 to the secondary hopper 92. The flapper valves 96 and 98 are sequentially operated to enable pellets to flow from the hopper 70 to the secondary hopper 92. The pellets are intermittently fed from the pressurized secondary hopper 92 to the preheating furnace 22 by the pneumatic conveyor 72. As was previously mentioned in connection with the embodiment of FIG. 1, the pellets could be returned to the drying furnace 20 rather than to the preheating furnace 22.

In view of the foregoing description, it can be seen that the cost of pelletizing ore is reduced by the present invention by reclaiming hot or heated pellets which are spilled before reaching the indurating kiln 34. The spilled pellets are returned to the preheating furace 22 by a pneumatic transport system 66 which collects the spilled pellets in a hopper 70 and pneumatically conveys them, with a pneumatic conveyor 72, back to the preheating furnace 22 before the pellets have cooled. Thus, during normal operation of the pellet hardening machine 10, the spilled pellets are returned to the preheating furnace 22 at a temperature above 200° F. temperature at which some of the pellets may initially enter the preheating furnace. While the present invention is particularly well suited for the processing of taconite ore, it will be apparent that the invention can be readily adapted to the processing of other ores, such as limestone, phosphates, bauxites, magnesites and other nonferrous heat treatable materials in addition to other low-quality iron ores.

Having described my invention, I claim:

1. An apparatus for pelletizing ore comprising balling means for forming green pellets, a pellet hardening assembly for processing the green pellets from said balling means to form pellets of a desired hardness, said hardening assembly including a drying section for initially heating the green pellets, a preheating section for further heating the pellets from said drying section, an indurating section for heating the pellets to a desired hardness, transfer means for conducting the pellets from said preheating section to said indurating section, and a cooling section wherein the hardened pellets from said indurating section are cooled, collector means located between said preheating section and said indurating section for collecting pellets spilled from said transfer means, and a conveyor directly interconnecting said collector means and one of said drying and preheating sections for returning the pellets spilled from said transfer means to said one section before the spilled pellets have cooled to a temperature of 200° F.

2. An apparatus as set forth in claim 1 wherein said conveyor is a pneumatic conveyor which returns the spilled pellets to said one section under the influence of a stream of air.

3. In an iron ore pellet processing system including furnace means for heating iron ore pellets, a kiln for indurating the iron ore pellets and a transfer means for conducting heated iron ore pellets from said furnace means to said kiln, the improvement comprising a transport system including means for collecting spilled pellets and pneumatic conveyor means for conveying the spilled pellets to said furnace means.

4. In an iron ore pellet processing system as set forth in claim 3 wherein said transport system is constructed in such a manner as to return the spilled pellets to said furnace means with the spilled pellets at a temperature above 200° F.

5. A method of pelletizing ores comprising the steps of forming green pellets, heating the green pellets in a furnace, transferring heated pellets from the furnace to a kiln, heating the pellets in the kiln until they obtain a desired hardness, collecting the pellets spilled during said transferring stop and pneumatically conveying the collected pellets to return them directly to said furnace for further processing.

6. A method of pelletizing ores as set forth in claim 5 wherein said pellets are at a temperature above 200° F. when they are returned to said furnace.

7. A method of processing ore as set forth in claim 5 wherein said step of collecting the spilled pellets includes the steps of accumulating the pellets in a first hopper and conducting the pellets to a pressurized secondary hopper through a feeder assembly to minimize the escape of a pressurizing gas from the secondary hopper.

8. A method of processing ore including the steps of crushing crude ore, grinding the crushed ore to a relatively fine size, concentrating the metallic constituent of the ore, forming the metallic constituent into pellets, heating said pellets in a furnace, transferring the heated pellets to a kiln and indurating the pellets in said kiln, the improvement comprising the step of collecting pellets spilled during said transferring step and pneumatically conveying the collected pellets back to said furnace for further processing.

References Cited

UNITED STATES PATENTS

| | | | |
|---|---|---|---|
| 3,188,195 | 6/1965 | Price | 75—3 X |
| 3,333,951 | 8/1967 | Ban | 75—3 |
| 3,313,534 | 4/1967 | Frans | 263—32 |
| 3,416,778 | 12/1968 | Chabaglian | 263—32 |
| 3,432,287 | 3/1969 | Greaves et al. | 266—21 |

ALLEN B. CURTIS, Primary Examiner

U.S. Cl. X.R.

263—32; 266—20; 302—17